United States Patent
Zhao

(10) Patent No.: US 9,405,757 B2
(45) Date of Patent: Aug. 2, 2016

(54) FILE STORAGE SYSTEM, APPARATUS, AND FILE ACCESS METHOD

(71) Applicant: Huawei Technologies Co., Ltd., Shenzhen, Guangdong (CN)

(72) Inventor: Kai Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 14/340,290

(22) Filed: Jul. 24, 2014

(65) Prior Publication Data

US 2014/0365537 A1  Dec. 11, 2014

Related U.S. Application Data

(63) Continuation of application No. PCT/CN2013/072812, filed on Mar. 18, 2013.

(30) Foreign Application Priority Data

May 28, 2012  (CN) .......................... 2012 1 0168019

(51) Int. Cl.
*G06F 17/00* (2006.01)
*G06F 17/30* (2006.01)
*H04L 29/08* (2006.01)
*H04L 12/26* (2006.01)

(52) U.S. Cl.
CPC .......... *G06F 17/30091* (2013.01); *H04L 43/50* (2013.01); *H04L 67/025* (2013.01); *H04L 67/1097* (2013.01)

(58) Field of Classification Search
CPC .......... G06F 17/30091; G06F 17/2241; G06F 17/24; G06F 17/30011; G06F 17/30489
See application file for complete search history.

(56) References Cited

U.S. PATENT DOCUMENTS

| | | |
|---|---|---|
| 2009/0177860 A1 | 7/2009 | Zhu et al. |
| 2010/0333116 A1 | 12/2010 | Prahlad et al. |
| 2012/0185454 A1 | 7/2012 | Zhang |
| 2013/0007114 A1 | 1/2013 | Wee et al. |
| 2014/0052864 A1 | 2/2014 | Van Der Linden et al. |
| 2014/0222985 A1* | 8/2014 | Chen ...................... H04L 67/10 709/223 |

FOREIGN PATENT DOCUMENTS

| | | |
|---|---|---|
| CN | 1652090 A | 8/2005 |
| CN | 101576854 A | 11/2009 |
| CN | 101763418 A | 6/2010 |
| CN | 101883103 A | 11/2010 |
| CN | 101888405 A | 11/2010 |
| CN | 102143215 A | 8/2011 |
| CN | 102143228 A | 8/2011 |
| CN | 102307221 A | 1/2012 |
| CN | 102460393 A | 5/2012 |
| CN | 102750324 A | 10/2012 |

* cited by examiner

*Primary Examiner* — Truong Vo

(57) ABSTRACT

Embodiments of the present invention provide a file storage system, an apparatus, and a file access method. The system includes a storage management apparatus and an adapter, where the storage management apparatus is configured to receive an operation instruction sent by a user interface apparatus and send a invoking command to the adapter according to the operation instruction, and the adapter controls, according to the invoking command, a public cloud storage system to perform a file storage or read operation and return a operation result. The technical solutions of the present invention are implemented based on existing public cloud storage and cloud computing technologies and have advantages of low construction complexity and ease of implementation.

17 Claims, 5 Drawing Sheets

FILE STORAGE SYSTEM, APPARATUS, AND FILE ACCESS METHOD

CROSS-REFERENCE TO RELATED APPLICATIONS

This application is a continuation of International Application No. PCT/CN2013/072812, filed on Mar. 18, 2013, which claims priority to Chinese Patent Application No. 201210168019.8, filed on May 28, 2012, both of which are hereby incorporated by reference in their entireties.

TECHNICAL FIELD

The present invention relates to a storage technology, and in particular, to a file storage system, an apparatus, and a file access method.

BACKGROUND

After "cloud computing" emerges, more and more service providers release cloud computing services, and more and more users use cloud computing services and enjoy core benefits brought by cloud computing: low-cost construction business.

A cloud storage service is a cloud computing mode that uses storage space as resources and allows a user to use the storage space as required, without worrying the depletion of storage space on an information technology (Information Technology, IT) device. The appearance of a large number of cloud storage services makes it possible to construct a low-cost file storage system.

Constructing a file storage system directly on the basis of the capability provided by a shared cloud storage service is the simplest scheme, but for an enterprise, the top concern is security and reliability of data assets. However, facts prove that the actual performance of each cloud storage service falls short of users' expectations. Therefore, private cloud storage is currently a mainstream scheme to construct a file storage system by using the cloud storage technology.

Private cloud storage, built upon an enterprise's infrastructure, is open only to internal users of the enterprise. Therefore, the enterprise has the control right of the storage system and can reuse the enterprise's existing storage resources to a certain extent. Private cloud storage is a complex system formed by multiple portions including networks, storage devices, servers, application software, public access interfaces, and client programs. The portions use storage devices as the core and externally provide data storage and a business access service through application software. The construction of such a private cloud storage system requires an enterprise to provide sufficient storage devices that can be virtualized and sufficient sites, to set up a network for connecting the storage devices, and then to deploy, in one by one mode, templates to run at the infrastructure layer, management layer, and application interface layer on the network. Therefore, it can be seen that the construction of a private cloud storage system is complex and implementation is relatively difficult.

SUMMARY

Embodiments of the present invention provide a file storage system, an apparatus, and a file access method to reduce complexity of constructing a file storage system and raise the implementability of the file storage system.

An aspect of an embodiment of the present invention provides a file storage system, including a storage management apparatus and an adapter.

The storage management apparatus is configured to receive an operation instruction sent by a user interface apparatus; if the operation instruction is a storage instruction for storing a first file, and the storage instruction includes an identifier of the first file, determine a first public cloud storage system for storing the first file among multiple public cloud storage systems and send a storage invoking command to a first adapter corresponding to the first public cloud storage system, so that the first adapter stores the first file in the first public cloud storage system; receive a first storage position sent by the first adapter, and store, in a file position table, a correspondence relationship between the identifier of the first file and the first storage position, where the first storage position is sent by the first public cloud storage system to the first adapter, the first storage position is a storage position of the first file in the first public cloud storage system, and the file position table stores a correspondence relationship between an identifier of a file and a storage position of the file; and, if the operation instruction is a read instruction for reading a second file, and the read instruction includes an identifier of the second file, determine, according to the identifier of the second file and the correspondence relationship, in the file position table, between the identifier of the file and the storage position of the file, a second storage position corresponding to storage of the second file, and send, according to the second storage position, a read-out invoking command to a second adapter corresponding to the second storage position, so that the second adapter acquires, according to the second storage position, the second file from a second public cloud storage system; receive the second file sent by the second adapter, and send the second file to the user interface apparatus.

The adapter is configured to receive the operation instruction sent by the storage management apparatus; if the operation instruction is the storage invoking command, store the first file in the first public cloud storage system and receive the first storage position of the first file in the first public cloud storage system, where the first storage position is returned by the first public cloud storage system and the storage invoking instruction includes the identifier of the first file; send the first storage position to the storage management apparatus, so that the storage management apparatus stores, in the file position table, the correspondence relationship between the identifier of the first file and the first storage position; and, if the operation instruction is the read-out invoking command, acquire, according to the second storage position, the second file from the second public cloud storage system, and send the second file to the storage management apparatus, where the read-out invoking command is sent after the storage management apparatus determines the second storage position according to the identifier of the second file and the correspondence relationship, in the file position table, between the identifier of the file and the storage position of the file.

The foregoing file storage system further includes a user interface apparatus, configured to receive the storage instruction for storing the first file, send the storage instruction to the storage management apparatus, so that the storage management apparatus performs, according to the storage instruction, a storage operation on the first file, where the storage instruction is inputted by an instruction input device, and the storage instruction includes the identifier of the first file; or receive the read instruction for reading the second file, and send the read instruction to the storage management apparatus, so that the storage management apparatus performs a read operation on the second file; and receive the second file returned by the storage management apparatus, where the read instruction is inputted by the instruction input device and the read instruction includes the identifier of the second file.

Another aspect of an embodiment of the present invention provides a storage management apparatus, including:

an instruction receiving and management unit, configured to receive an operation instruction sent by a user interface apparatus;

a storage management unit, configured to, if the operation instruction is a storage instruction for storing a first file, and the operation instruction includes an identifier of the first file, determine a first public cloud storage system for storing the first file among multiple public cloud storage systems and send a storage invoking command to a first adapter corresponding to the first public cloud storage system, so that the first adapter stores the first file in the first public cloud storage system; receive a first storage position sent by the first adapter, and store, in a file position table, a correspondence relationship between the identifier of the first file and the first storage position, where the first storage position is sent by the first public cloud storage system to the first adapter, the first storage position is a storage position of the first file in the first public cloud storage system, and the file position table stores a correspondence relationship between an identifier of a file and a storage position of the file; and a read management unit, configured to, if the operation instruction is a read instruction for reading a second file, and the read instruction includes an identifier of the second file, determine, according to the identifier of the second file and the correspondence relationship, in the file position table, between the identifier of the file and the storage position of the file, a second storage position corresponding to storage of the second file and send, according to the second storage position, a read-out invoking command to a second adapter corresponding to the second storage position, so that the second adapter acquires, according to the second storage position, the second file from a second public cloud storage system; receive the second file sent by the second adapter and send the second file to the user interface apparatus.

The foregoing storage management apparatus further includes a status monitoring management unit, configured to periodically send a status monitoring command to each adapter, so that each adapter acquires data about a current running status of the corresponding public cloud storage system; receive the data about the current running status of the corresponding public cloud storage system sent by each adapter; and monitor a running status of each public cloud storage system according to the data about the current running status of each public cloud storage system.

The foregoing storage management apparatus further includes a status test management unit, configured to send a status test command to each adapter, so that each adapter stores a preset test file in the corresponding public cloud storage system, receive a storage position of the test file in the corresponding public cloud storage system, where the storage position of the test file is sent by each adapter; and calculate to obtain data about the current running status of each public cloud storage system according to the time the status test command is sent to each adapter and the time the storage position of the test file is received, where the storage position of the test file is returned by each adapter.

The foregoing storage management apparatus further includes a reliability processing unit, configured to determine, according to historical data about a running status of and the data about the current running status of each public cloud storage system in multiple public cloud storage systems, a pubic cloud storage system that does not meet a reliability requirement and a public cloud storage system that meets the reliability requirement, and migrate a file stored in the public cloud storage system that does not meet the reliability requirement to one or more public cloud storage systems that meet the reliability requirement.

Still another aspect of an embodiment of the present invention provides an adapter, including:

a receiving unit, configured to receive an operation instruction sent by a storage management apparatus;

a storage processing unit, configured to, if the operation instruction is a storage invoking command, store a first file in a first public cloud storage system; receive a first storage position of the first file in the first public cloud storage system, where the first storage position is returned by the first public cloud storage system and the storage invoking command includes an identifier of the first file; and send the first storage position to the storage management apparatus, so that the storage management apparatus stores, in a file position table, a correspondence relationship between the identifier of the first file and the first storage position; and a read processing unit, configured to, if the operation instruction is a read-out invoking command, acquire, according to a second storage position, a second file from a second public cloud storage system, and send the second file to the storage management apparatus, where the read-out invoking command is sent after the storage management apparatus determines the second storage position according to an identifier of the second file and a correspondence relationship, in the file position table, between an identifier of a file and a storage position of the file.

The foregoing adapter further includes a status monitoring processing unit, configured to periodically receive a status monitoring command sent by the storage management apparatus; invoke, according to the status monitoring command, a user interface for acquiring running status data, where the user interface is provided by a corresponding public cloud storage system; acquire data about a current running status of the public cloud storage system, and send the data about the current running status of the corresponding public cloud storage system to the storage management apparatus, so that the storage management apparatus monitors, according to the current running status data, a running status of the public cloud storage system corresponding to the adapter.

The foregoing adapter further includes a status test processing unit, configured to receive a status test command sent by the storage management apparatus; store a preset test file in a corresponding public cloud storage system according to the status test command and receive a storage position of the test file, where the storage position the of the test file is returned by the public cloud storage system; and send the storage position of the test file to the storage management apparatus, so that the storage management apparatus calculates to obtain, according to the time the status test command is sent and the time the returned storage position of the test file is received, data about the current running status of the public cloud storage system corresponding to the adapter.

Still another aspect of an embodiment of the present invention provides a file access method, including:

receiving, by a storage management apparatus, an operation instruction sent by a user interface apparatus;

if the operation instruction is a storage instruction for storing a first file, and the storage instruction includes an identifier of the first file, determining, by the storage management apparatus, a first public cloud storage system for storing the first file among multiple public cloud storage systems and sending a storage invoking command to a first adapter corresponding to the first public cloud storage system, so that the first adapter stores the first file in the first public cloud storage system; receiving a first storage position sent by the first adapter, and storing, in a file position table, a correspondence relationship between the identifier of the first file and the first storage position, where the first storage position is sent by the first public cloud storage system to the first adapter, the first storage position is a storage position of the first file in the first public cloud storage system, and the file position table stores a correspondence relationship between an identifier of a file and a storage position of the file; and if the operation instruction is a read instruction for reading a second file, and the read instruction includes an identifier of the second file, determining, by the storage management apparatus according to the identifier of the second file and the correspondence relationship, in the file position table, between the identifier of the file and the storage positions of the file, a second storage position corresponding to storage of the second file and sending, according to the second storage position, a read-out invoking command to a second adapter corresponding to the second storage position, so that the second adapter acquires, according to the second storage position, the second file from a second public cloud storage system; receiving the second file sent by the second adapter, and sending the second file to the user interface apparatus.

The foregoing file access method, where the determining, by the storage management apparatus, the first public cloud storage system for storing the first file among multiple public cloud storage systems includes: determining, by the storage management apparatus according to data about current running status of multiple public cloud storage systems, a public cloud storage system with the best running status among multiple public cloud storage systems as the first public cloud storage system, where the current running status data includes a current response speed of the public cloud storage system and/or a current available storage space of the public cloud storage system.

The foregoing file access method, before the sending the storage invoking command to the first adapter corresponding to the first public cloud storage system, further including: performing encryption, blocking, and/or redundancy processing on the first file.

The foregoing file access method, where the second file has a redundant backup, the redundant backup of the second file is stored in more than one public cloud storage system, and the determining, by the storage management apparatus according to the identifier of the second file and the correspondence relationship, in the file position table, between the identifier of the file and the storage position of the file, the second storage position corresponding to storage of the second file includes: determining, by the storage management apparatus according to the identifier of the second file and the correspondence relationship, in the file position table, between the identifier of the file and the storage position of the file, all public cloud storage systems that store the second file or the redundant backup of the second file, determining, according to data about current running status of all public cloud storage systems, a public cloud storage system with the best running status as the second public cloud storage system, and acquiring a storage position of the second file or the redundant backup of the second file in the second public cloud storage system and using the storage position as the second storage position.

The foregoing file access method further includes: periodically sending, by the storage management apparatus, a status monitoring command to each adapter, so that each adapter acquires data about a current running status of a corresponding public cloud storage system; and receiving the data about the current running status of the corresponding public cloud storage system sent by each adapter, and monitoring a running status of each public cloud storage system according to the data about the current running status of each public cloud storage system.

The file access method further includes: sending, by the storage management apparatus, a status test command to each adapter, so that each adapter stores a preset test file in the corresponding public cloud storage system;

receiving a storage position of the test file in the corresponding public cloud storage system, where the storage position is sent by each adapter; and calculating to obtain data about a current running status of each public cloud storage system according to the time the status test command is sent to each adapter and the time the storage position of the test file is received, where the storage position is returned by each adapter.

The file access method further includes: determining, by the storage management apparatus according to historical data about a running status of and the data about the current running status of each public cloud storage system in multiple public cloud storage systems, a pubic cloud storage system that does not meet a reliability requirement and a public cloud storage system that meets the reliability requirement, and migrating a file stored in the public cloud storage system that does not meet the reliability requirement to one or more public cloud storage systems that meet the reliability requirement.

Still another aspect of an embodiment of the present invention provides a file access method, including:

receiving, by an adapter, an operation instruction sent by a storage management apparatus;

if the operation instruction is a storage invoking command, storing, by the adapter, a first file in a first public cloud storage system; receiving a first storage position of the first file in the first public cloud storage system, where the first storage position is returned by the first public cloud storage system, and the storage invoking command includes an identifier of the first file; and sending the first storage position to the storage management apparatus, so that the storage management apparatus stores, in a file position table, a correspondence relationship between the identifier of the first file and the first storage position; and if the operation instruction is a read-out invoking command, acquiring, by the adapter according to a second storage position, a second file from a second public cloud storage system and sending the second file to the storage management apparatus, where the read-out invoking command is sent after the storage management apparatus determines the second storage position according to an identifier of the second file and a correspondence relationship, in the file position table, between an identifier of a file and a storage position of the file.

The file access method further includes: periodically receiving, by the adapter, a status monitoring command sent by the storage management apparatus;

invoking, according to the status monitoring command, a user interface for acquiring running status data, where the user interface is provided by a public cloud storage system corresponding to the adapter; and acquiring data about a current running status of the public cloud storage system; and sending, by the adapter, the data about the current running status of the corresponding public cloud storage system to the storage management apparatus, so that the storage management apparatus monitors, according to the current running status data, a running status of the public cloud storage system corresponding to the adapter.

The file access method further includes: receiving, by the adapter, a status test command sent by the storage management apparatus;

storing, according to the status test command, a preset test file in the public cloud storage system corresponding to the adapter and receiving a storage position of the test file, where the storage position is returned by the public cloud storage system; and sending the storage position of the test file to the storage management apparatus, so that the storage management apparatus calculates to obtain, according to the time the status test command is sent to the adapter and the time the storage position of the test file is received, data about a current running status of the public cloud storage system corresponding to the adapter, where the storage position of the test file is returned by the adapter.

The file storage system, storage management apparatus, and adapter provided in embodiments of the present invention use an existing heterogeneous public cloud storage system as a storage device to construct a file storage system that includes a storage management apparatus and an adapter. The storage management apparatus needs to determine only a public cloud storage system for storing a file or a storage position of the file, and the adapter implements interface function conversion with a public cloud storage system, making it possible to use multiple heterogeneous public cloud storage systems as storage devices and implementing a file storage system constructed by using a heterogeneous public cloud storage system as a storage device. Compared with a private cloud storage system in the prior art, the file storage system in embodiments of the present invention requires no investment on a fixed asset such as a storage device and a network device, no site construction, and no maintenance of infrastructure such as a storage device, greatly reducing the complexity of constructing a file storage system and improving the implementability of the file storage system.

The file access method in embodiments of the present invention is implemented based on the file storage system provided in embodiments of the present invention. The construction complexity of the file storage system in the embodiments of the present invention is relatively low, reducing the file access complexity to a certain extent and contributing to improvement of file access efficiency.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention more clearly, the following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art according to the embodiments of the present invention without creative efforts shall fall within the protection scope of the present invention.

Figure 1:
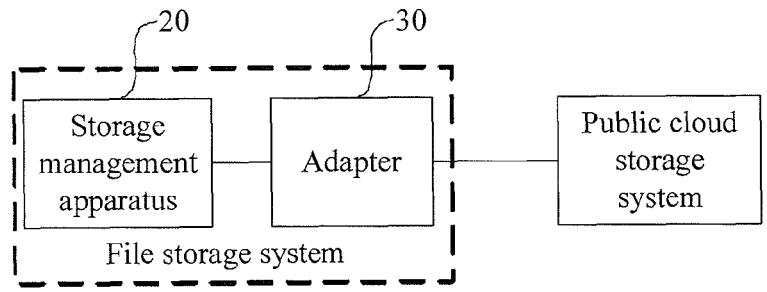
FIG. 1 is a schematic structural diagram of a file storage system according to an embodiment of the present invention.

FIG. 1 is a schematic structural diagram of a file storage system according to an embodiment of the present invention. As shown in FIG. 1, the file storage system in this embodiment includes a storage management apparatus 20 and an adapter 30.

The storage management apparatus 20 is configured to receive an operation instruction sent by a user interface apparatus; if the operation instruction is a storage instruction for storing a first file and the storage instruction includes an identifier of the first file, determine a first public cloud storage system for storing the first file among multiple public cloud storage systems and send a storage invoking command to a first adapter corresponding to the first public cloud storage system, so that the first adapter stores the first file in the first public cloud storage system; receive a first storage position sent by the first adapter, and store, in a file position table, a correspondence relationship between the identifier of the first file and the first storage position, where the first storage position is sent by the first public cloud storage system to the first adapter, the first storage position is a storage position of the first file in the first public cloud storage system, and the file position table stores a correspondence relationship between an identifier of a file and a storage position of the file; and, if the operation instruction is a read instruction for reading a second file, and the read instruction includes an identifier of the second file, determine, according to the identifier of the second file and the correspondence relationship, in the file position table, between the identifier of the file and the storage position of the file, a second storage position corresponding to storage of the second file, and send, according to the second storage position, a read-out invoking command to a second adapter corresponding to the second storage position, so that the second adapter acquires, according to the second storage position, the second file from a second public cloud storage system; receive the second file sent by the second adapter, and send the second file to the user interface apparatus.

Optionally, the foregoing storage instruction includes other information, such as a user identifier and a size of the first file, in addition to the identifier of the first file. The foregoing read instruction includes the user identifier in addition to the identifier of the second file. The user identifier may be a user name, a user account, or the like. The identifier of the first file may be, but is not limited to, a name of the first file, a globally unique identifier (Globally Unique Identifier, GUID), or a uniform resource locator (Uniform/Universal Resource Locator, URL). The identifier of the second file may be, but is also not limited to, a name of the second file, a GUID, or a URL.

It can be seen from the above, the file storage system in this embodiment uses a pubic cloud storage system based on the prior art as a basic device and operations on a physical storage device and a network in the public cloud storage system, such as management, virtualization, monitoring, and maintenance are performed by the public cloud storage system. The storage management apparatus 20 in this embodiment does not require functions closely related to infrastructure such as grid computing, distributed system management, and cluster management but only needs to, when storing a file, determine a public cloud storage system for storing a file to be stored and invoke a corresponding adapter to perform a storage operation; store a correspondence relationship between a storage position of a file and an identifier of the file after the file storage is complete; and, when acquiring the file, determine the storage position of the file and invoke the corresponding adapter to perform an acquisition operation. It can be seen that the storage management subsystem in this embodiment has advantages of simple functions and ease of implementation, which is conducive to reducing construction complexity of the file storage system in this embodiment.

The adapter 30 connects to the storage management apparatus 20 and the public cloud storage system, and is configured to receive the operation instruction sent by the storage management apparatus 20; if the operation instruction is the storage invoking command, store the first file in the first public cloud storage system and receive the first storage position of the first file in the first public cloud storage system, where the first storage position is returned by the first public cloud storage system, and the storage invoking command includes the identifier of the first file; send the first storage position to the storage management apparatus 20, so that the storage management apparatus 20 stores, in the file position table, the correspondence relationship between the identifier of the first file and the first storage position; and, if the operation instruction is the read-out invoking command, acquire, according to the second storage position, the second file from the second public cloud storage system, and send the second file to the storage management apparatus 20, where the read-out invoking command is sent after the storage management apparatus 20 determines the second storage position according to the identifier of the second file and the correspondence relationship, in the file position table, between the identifier of the file and the storage position of the file.

The file storage system in this embodiment may include at least one adapter 30 (only one is shown in the accompanying figure), and each adapter 30 is corresponding to one public cloud storage system. Specifically, the adapter 30 completes storage of the first file and read of the second file mainly by invoking an internal user interface of the file storage system in this embodiment and a user interface provided by the public cloud storage system. However, the file storage system in this embodiment and the public cloud storage system may use different protocols and may also support different data formats. Therefore, the adapter 30 in this embodiment further has a function for conversion between the user interface provided by the file storage system in this embodiment and the user interface provided by the public cloud storage system. That is, the internal user interface of the file storage system in this embodiment is converted to the user interface supported by the used pubic cloud storage system, and then the converted user interface is invoked to complete the read operation on the file. The conversion mainly includes conversion of a protocol used by the user interface and a data format used by the user interface. An interface of each public cloud storage system is a user interface. The user interface herein refers to an interface provided by the file storage system in this embodiment or the public cloud storage system for a user so that the user is capable of completing the file storage or read operation.

For example, the adapter 30 in this embodiment may be an S3 adapter, a network disk adapter, a cloud data management interface (Cloud Data Management Interface, CDMI) adapter, or the like.

In this embodiment, the file storage system interacts with heterogeneous public cloud storage systems provided by different providers through different adapters 30 so as to use storage capabilities provided by the different public cloud storage systems. For the storage management apparatus 20, the adapter 30 implements a unified file operation interface, shields differences brought by user interfaces of the different public cloud storage systems, so that the storage management apparatus 20 performs unified scheduling among different public cloud storage systems.

It can be seen from the above that a basic storage capability of the file storage system in this embodiment is built upon an existing public cloud storage system. It does not need to directly deal with a storage device or a storage network, for example, a user does not need to purchase a storage device, build a network, or operate and maintain storage infrastructure of the user, but only needs to handle access of different pubic cloud storage systems by using an adapter. A construction process is relatively simple and does not directly deal with a storage device or a storage network which may greatly lower system construction costs and operation and maintenance costs.

Figure 2:
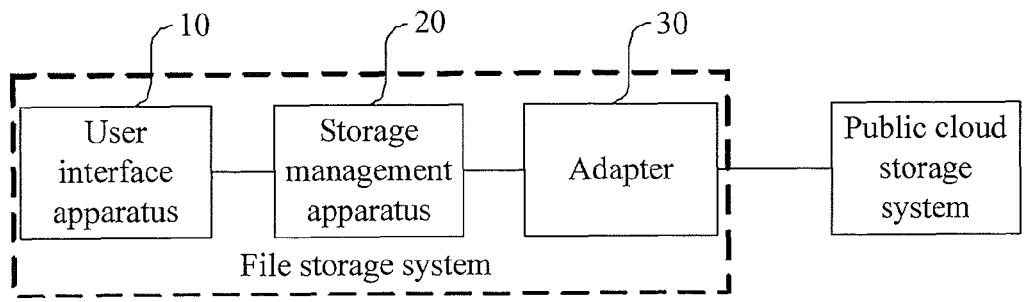
FIG. 2 is a schematic structural diagram of a file storage system according to another embodiment of the present invention.

FIG. 2 is a schematic structural diagram of a file storage system according to another embodiment of the present invention. This embodiment is implemented based on the embodiment illustrated in FIG. 1. As shown in FIG. 2, the system in this embodiment includes a user interface apparatus 10 in addition to a storage management apparatus 20 and an adapter 30.

The user interface apparatus 10 connects to the storage management apparatus 20 and is configured to receive the storage instruction for storing the first file and send the storage instruction to the storage management apparatus 20, so that the storage management apparatus 20 performs a storage operation on the first file according to the storage instruction, where the storage instruction is inputted by an instruction input device, and the storage instruction includes the identifier of the first file; or receive the read instruction for reading the second file, and send the read instruction to the storage management apparatus 20, so that the storage management apparatus 20 performs the read operation on the second file; and receive the second file returned by the storage management apparatus 20, where the read instruction is inputted by the instruction input device and the read instruction includes the identifier of the second file.

For description herein, the user interface apparatus 10 in this embodiment mainly provides an interface for the instruction input device, which may be a client, a user screen, or various application programming interfaces (Application Programming Interface, API). The instruction input device may be but is not limited to a user terminal device, such as a personal computer, a mobile phone, a tablet computer, and a thin client. Specifically, the user inputs the storage instruction or the read instruction to the user interface apparatus 10 through a screen of the instruction input device or an input apparatus.

Optionally, the user interface apparatus 10 in this embodiment may be implemented on one device or may also be implemented on multiple devices. This depends on an application requirement. For example, if the file storage system is oriented to an enterprise, all devices of the enterprise can be used as the user interface apparatus 10 to facilitate the file read operation.

For description herein, the storage management apparatus 20 in this embodiment may be deployed on one device or may also be deployed on multiple devices. In other words, the storage management apparatus 20 in this embodiment may be implemented by one device or may also be implemented by multiple devices jointly.

In addition, the adapter 30 in this embodiment may be deployed on one device or may also be deployed on multiple devices.

Furthermore, the user interface apparatus 10, the storage management apparatus 20, and the adapter 30 in this embodiment may be deployed on a same device or may also be deployed on multiple devices. In other words, the user interface apparatus 10, the storage management apparatus 20, and the adapter 30 in this embodiment may be a same device or may also be different devices.

Figure 3:
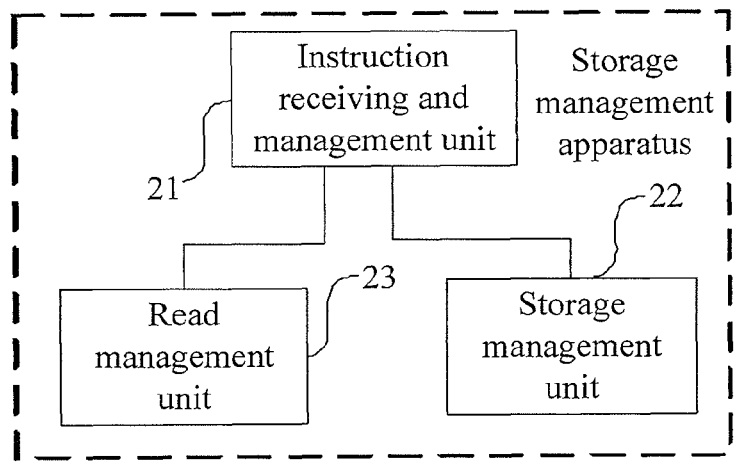
FIG. 3 is a schematic structural diagram of a storage management apparatus according to an embodiment of the present invention.

FIG. 3 is a schematic structural diagram of a storage management apparatus according to an embodiment of the present invention. As shown in FIG. 3, the apparatus in this embodiment includes an instruction receiving and management unit 21, a storage management unit 22, and a read management unit 23.

The instruction receiving and management unit 21 is configured to receive an operation instruction sent by a user interface apparatus.

Optionally, the user interface apparatus may receive a storage instruction for storing a first file and send the storage instruction to the instruction receiving and management unit 21 of the storage management apparatus, where the storage instruction is inputted by an instruction input device; or, the user interface apparatus may receive a read instruction for reading a second file and send the read instruction to the instruction receiving and management unit 21 of the storage management apparatus, where the read instruction is inputted by the instruction input device. Based on this, the operation instruction received by the instruction receiving and management unit 21 may be the storage instruction or the read instruction. The user interface apparatus is mainly configured to provide an interface for the instruction input device, which may be a client, a user interface, or various APIs. The instruction input device may be but is not limited to a user terminal device, such as a personal computer, a mobile phone, a tablet computer, and a thin client.

The storage management unit 22 connects to the instruction receiving and management unit 21 and is configured to, if the operation instruction received by the instruction receiving and management unit 21 is the storage instruction for storing the first file, and the storage instruction includes an identifier of the first file, determine a first public cloud storage system for storing the first file among multiple public cloud storage systems and send a storage invoking command to a first adapter corresponding to the first public cloud storage system, so that the first adapter stores the first file in the first public cloud storage system; receive a first storage position sent by the first adapter, and store, in a file position table, a correspondence relationship between the identifier of the first file and the first storage position, where the first storage position is sent by the first public cloud storage system to the first adapter, the first storage position is a storage position of the first file in the first public cloud storage system, and the file position table stores a correspondence relationship between an identifier of a file and a storage position of the file.

Optionally, the foregoing storage instruction includes other information, such as a user identifier and a size of the first file, in addition to the identifier of the first file. The user identifier may be a user name, a user account, or the like. The identifier of the first file may be, but is not limited to, a name of the first file, a GUID, or a URL. Correspondingly, the storage management unit not only stores, in the file position table, the correspondence relationship between the identifier of the first file and the storage position of the first file but also stores a correspondence relationship between the identifier of the first file and information such as the size of the first file and the user identifier.

The read management unit 23 connects to the instruction receiving and management unit 21 and is configured to, if the operation instruction received by the instruction receiving and management unit 21 is the read instruction for reading the second file, and the read instruction includes an identifier of the second file, determine, according to the identifier of the second file and the correspondence relationship, in the file position table, between the identifier of the file and the storage position of the file, a second storage position corresponding to storage of the second file and send, according to the second storage position, a read-out invoking command to a second adapter corresponding to the second storage position, so that the second adapter acquires, according to the second storage position, the second file from a second public cloud storage system; receive the second file sent by the second adapter and send the second file to the user interface apparatus.

Optionally, the foregoing read instruction includes the user identifier in addition to the identifier of the second file. The user identifier may be the user name, the user account, or the like. The identifier of the second file may be, but is also not limited to, a name of the second file, a GUID, or a URL.

In an optional implementation of this embodiment, before performing the file storage or read operation, the storage management unit 22 or the read management unit 23 performs user authentication according to the user identifier to improve file reliability or security. A specific authentication process is as follows: After receiving the operation instruction sent by the user interface apparatus, the instruction receiving and management unit 21 sends an authentication request to the storage management unit 22 or the read management unit 23, where the authentication request includes the user identifier and a file identifier; the storage management unit 22 or the read management unit 23 performs the user authentication according to the user identifier and the file identifier and returns an authentication result to the instruction receiving and management unit 21. The process in which the user authentication is performed by the storage management unit 22 or the read management unit 23 according to the user identifier and file identifier is mainly to determine whether the user has a relevant right (such as read or storage) to operate the file. When the authentication result is passing, the instruction receiving and management unit 21 sends the foregoing operation instruction to the storage management unit 22 or the read management unit 23.

Specifically, if the user needs to store the first file, the foregoing process in which the user authentication is performed helps improve reliability and security of the file stored in the file storage system. If the user needs to read the second file, the foregoing process in which the user authentication is performed helps ensure security of the file stored in the file storage system.

It can be seen from the above, the storage management apparatus in this embodiment does not require functions closely related to infrastructure such as grid computing, distributed system management, and cluster management and only needs to, when storing a file, determine a public cloud storage system for storing a file to be stored and invoke a corresponding adapter to perform a storage operation; store a correspondence relationship between the storage position of the file and the file identifier after the file storage is complete; and, when acquiring the file, determine the storage position of the file and invoke the corresponding adapter to perform an acquisition operation. The storage management apparatus has the advantages of simple functions and ease of implementation. Furthermore, if the storage management apparatus provided in this embodiment is configured to construct a file storage system, the construction complexity is relatively low and the implementation is easy.

In an optional implementation of this embodiment, the storage management unit 22 sends the storage invoking command to the first adapter corresponding to the first public cloud storage system, so that the first adapter performs, before storing the first file in the first public cloud storage system, a security processing operation on the first file according to a preset technical means for improving file security and reliability. The technical means or security processing operation includes but is not limited to performing encryption, blocking, and redundancy processing on the first file. The security processing operation performed by the storage management unit 22 on the first file is used as an example for description.

For example, if the technical means is to perform encryption on the first file, the storage management unit 22 performs encryption on the first file by using an encryption algorithm provided in the foregoing technical means. The encryption of the first file prior to storage helps improve security of the first file.

For another example, if the technical means is to perform encryption and blocking processing on the first file, the storage management unit 22 first performs encryption on the first file by using the encryption algorithm provided in the foregoing technical means, and then performs the blocking on the encrypted first file according to a blocking policy provided in the foregoing technical means to form multiple blocked files. The blocking policy includes information such as the blocking of the first file according to the size of the first file, number of blocks into which the first file is divided, a size of each block, and the like. After the first file is divided into multiple blocked files, each blocked file is stored as an independent file. In this way, different blocked files may be stored in different public cloud storage systems. If a blocked file in a public cloud storage system is stolen, the stolen blocked file cannot be identified because it is only a part of the first file, thereby enhancing security of the first file. If damage or disruption of a public cloud storage system causes loss of a file stored on the public cloud storage system, only a part of the first file rather than the entire file is destroyed, thereby enhancing reliability of the first file.

In another aspect, this implementation in which the first file is divided into multiple blocked files and the storage and read operations are allowed to be concurrently performed on the blocked files helps improve operation efficiency of the first file as a whole.

In still another aspect, each pubic cloud storage system generally has a certain restriction on a size of a stored file. Therefore, the blocking processing performed on the first file by the storage management unit 22 can meet a restriction requirement of the public cloud storage system for the size of the stored file. For example, if an upper limit of the file size allowed by the first public cloud storage system is 100M and the size of the first file is 2G, the first file is divided into blocked files with the size smaller than 100M each. This may meet the restriction requirement of the first public cloud storage system on the file size and implement successful storage of the first file.

For description herein, after the first file is blocked, the storage management unit 22 needs to allocate an identifier to each blocked file, so as to store each blocked file independently. Meanwhile, the storage management unit 22 stores a correspondence relationship between the identifier of each blocked file and the identifier of the first file as well as a correspondence relationship between each blocked file and a storage position of each blocked file, so that the user reads the first file according to the identifier of the first file.

For another example, if the technical means is to perform a redundant backup on the first file, the storage management unit 22 performs the redundant backup on the first file according to the number of redundant backups provided in the foregoing technical means and stores the first file and the redundant backup of the first file as independent files. Meanwhile, the storage management unit 22 needs to store a correspondence relationship between each redundant backup of the first file and the first file as well as each redundant backup of the first file and a correspondence relationship between and the first file and the storage positions of each redundant backup.

This embodiment performs the redundant backup on the first file and stores the first file and multiple redundant backups of the first file, thereby helping prevent loss of the first file caused by a fault of the public cloud storage system and in the same way enhancing file security and reliability.

For another example, if the technical means is to perform the locking and redundant backup on the first file, the storage management unit 22 performs the blocking on the first file according to the blocking policy provided in the foregoing technical means to form blocked files and then performs the redundant backup on each blocked file according to the number of redundant backups that is provided in the foregoing technical means. Each redundant backup of each blocked file is stored as an independent file. The storage management unit 22 performs the blocking on the first file and then performs the redundant backup in unit of block. This may control redundancy efficiency on a finer granularity and further enhance the file security and reliability. For example, 300% redundancy of a whole 100 MB file occupies 300 MB storage space and the maximum number of storage positions is three. If the 100 MB file is divided into two blocked files with the size of 50 MB each, a total of 300 MB storage space is also occupied in the case of 300% redundancy degree but the maximum number of storage positions is six. A probability that three storage positions where all data of a file is stored fail among six storage positions is far lower than a probability that all three storage positions completely fail, thereby greatly enhancing reliability.

If the storage management unit 22 performs the blocking or the redundant backup on the first file, a process in which the storage management unit 22 selects the first public cloud storage system for the first file is actually a process in which the storage management unit 22 selects the public cloud storage system for each blocked file of the first file and/or each redundant backup.

Optionally, the foregoing preset technical means may be stored in storage space of the storage management apparatus. The storage management unit 22 may directly acquire the preset technical means from the storage space of the storage management apparatus or the storage management unit 22 may also acquire the preset technical means from another storage system.

Figure 4:
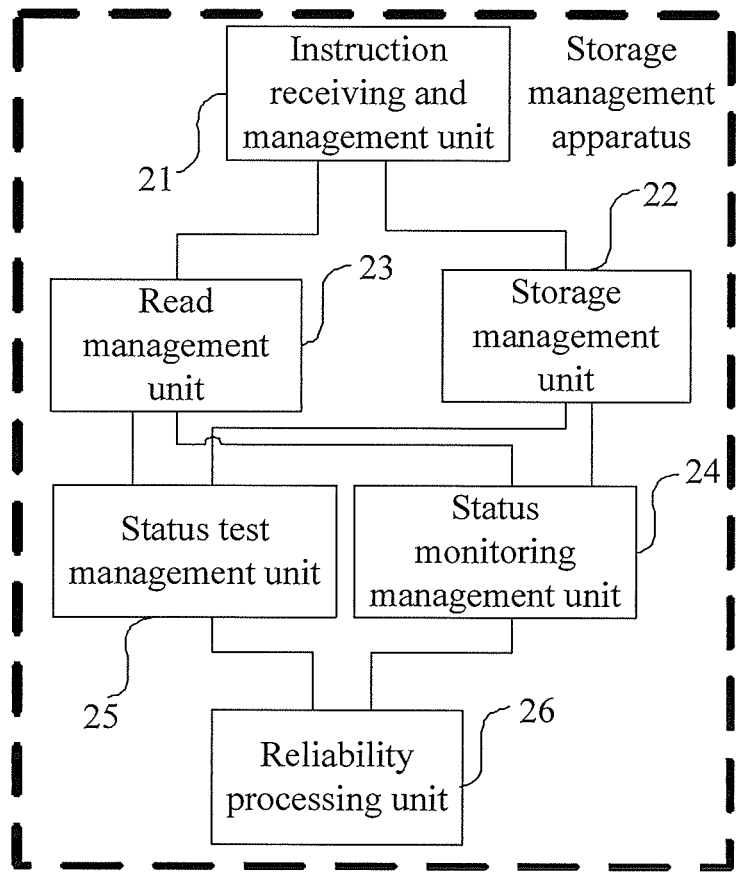
FIG. 4 is a schematic structural diagram of a storage management apparatus according to another embodiment of the present invention.

FIG. 4 is a schematic structural diagram of a storage management apparatus according to another embodiment of the present invention. This embodiment is implemented based on the embodiment illustrated in FIG. 3. As shown in FIG. 4, the apparatus in this embodiment includes the instruction receiving and management unit 21, the storage management unit 22, the read management unit 23, and further includes a status monitoring management unit 24.

The status monitoring management unit 24 is configured to send a status monitoring command to each adapter periodically, so that each adapter acquires data about a current running status of a corresponding public cloud storage system; receive the data about the current running status of the corresponding public cloud storage system sent by each adapter; and monitor a running status of each public cloud storage system according to the data about the current running status of each public cloud storage system.

The status monitoring management unit 24 further stores the data about the current running status of each public cloud storage system.

Generally, the running status data of each public cloud storage system is a major basis for measuring a running status and trend of each public cloud storage system and discovering a running exception in advance. The running status of a public cloud storage system mainly refers to a response speed of the pubic cloud storage system, where the response speed includes a speed of storing a file and/or a speed of acquiring the file. The running trend of a public cloud storage system mainly refers to a response speed change trend of the public cloud storage system. For example, the transmission speed for storing a file is changed from 200 kbit/s to 100 kbit/s, and it indicates that the running trend becomes poorer and poorer. In addition to the response speed of the public cloud storage system, the running status data of the public cloud storage system may further include available storage space of the pubic cloud storage system.

Generally, different public cloud storage systems provide different user interfaces. Some public cloud storage systems provide user interfaces for acquiring running status data. Based on this, the status monitoring management unit 24 periodically sends the status monitoring command to the corresponding adapter, so that the adapter directly invokes the user interfaces to acquire and return the data about the current running status of the public cloud storage system. The status monitoring management unit 24 stores and uses the data about the current running status of the public cloud storage system returned by the adapter.

In an optional implementation of this embodiment, the status monitoring management unit 24 may convert or calculate the data about the current running status of the public cloud storage system returned by the adapter, to form a unified indicator format for storage and usage. Where, conversion or calculation mainly refers to format conversion and unit conversion of the running status data. Generally, different public cloud storage systems provide different running status data. The response speed is used as an example. Some public cloud storage systems provide the number of bytes that can be sent per second and some public cloud storage systems provide a capability value of each piece. A conversion relationship exists between the capability value and the number of bytes that can be sent per second. Therefore, the status monitoring management unit 24 in this embodiment needs to convert or calculate the running status data so as to manage running status data of various public cloud storage systems in a unified manner. The monitoring mode of directly acquiring the running status data of the public cloud storage system and storage space information corresponding to a user is called objective monitoring mode.

Because the storage management apparatus in this embodiment uses a heterogeneous public cloud storage system as a basic storage resource and performs file storage and read on the public cloud storage system, service quality of each public cloud storage system directly deter nines reliability of the storage management apparatus in storing or reading a file. Therefore, the storage management apparatus in this embodiment monitors the running status of each public cloud storage system by using the status monitoring management unit 24 so as to discover a function exception in the pubic cloud storage system in time and ensure file storage or read reliability.

Further, the storage management apparatus in this embodiment further includes a status test management unit 25.

The status test management unit 25 is configured to send a status test command to each adapter, so that each adapter stores a preset test file in the corresponding public cloud storage system; receive a storage position of the test file in the corresponding public cloud storage system, where the storage position of the test file is sent by each adapter; and calculate to obtain data about the current running status of each public cloud storage system according to the time the status test command is sent to each adapter and the time the storage position of the test file is received, where the storage position is returned by each adapter.

The status test management unit 25, after obtaining the data about the current running status of each public cloud storage system through calculation, stores the data about the current running status of each public cloud system.

Specifically, the status test management unit 25 sends the status test command to each adapter. Each adapter stores the preset test file in the corresponding pubic cloud storage system according to the status test command, receives the storage position of the test file, and then sends the storage position of the test file to the status test management unit 25, where the storage position is returned by the public cloud storage system after completing the test file storage. The status test management unit 25 receives the storage position of the test file, returned by each adapter, and calculates to acquire, according to the time the status test command is sent to each adapter and the time the storage position of the test file is received, the data about the current running status of each public cloud storage system, where the storage position of the test file is returned by each adapter.

More specifically, the status test management unit 25 may record time when a test starts, that is, when sending the status test command to each adapter and record time again when receiving the storage position of the test file, where the storage position is returned by each adapter. The status test management unit 25 may calculate key indicators of each public cloud storage system such as the response time and the response speed according to the time recorded at two times, where the difference between the two recorded time is the response time and the size of the test file divided by the response time is to obtain the response speed. This embodiment uses storage of a test packet as an example for description. Therefore, the response speed is the storage speed.

Some public cloud storage systems may not provide user interfaces for externally acquiring running status data of the public cloud storage systems or provide user interfaces for acquiring only part of the running status data of the public cloud storage systems, which are insufficient to meet a requirement for the running status data required by the storage management apparatus in this embodiment to monitor the running status of the public cloud storage systems. The storage management apparatus in this embodiment simulates the user to use the public cloud storage system by using the status test management unit 25, and acquires the running status data of each public cloud storage system according to an actual implementation condition of storing the test file in the public cloud storage system, thereby achieving a purpose for monitoring a running status of each public cloud storage system and resolving a monitoring problem of a public cloud storage system that does not provide a user interface for acquiring running status data externally or provide insufficient user interfaces. This mode of acquiring the running status data of the public cloud storage system by means of the test is called subjective monitoring mode.

For description herein, apart from the running status data, the maximum storage space rented by the user on the public cloud storage system and current storage space in use (storage space information corresponding to the user for short) are also important indicators for measuring performance of the public cloud storage system. Specifically, if the storage space on the public cloud storage system used by the user reaches the maximum storage space rented by the user, the storage management apparatus does not allocate the public cloud storage system to the user even if the running status of the public cloud storage system is relatively good or the best. Therefore, the storage management apparatus may acquire storage space information corresponding to the user in a way similar to the way of acquiring the data about the current running status of the public cloud storage system.

Based on the foregoing, the storage management apparatus in this embodiment further includes a reliability processing unit 26.

The reliability processing unit 26 is configured to determine, according to historical data about the running status of and the data about the current running status of each public cloud storage system among multiple public cloud storage systems, a pubic cloud storage system that does not meet a reliability requirement and a public cloud storage system that meets the reliability requirement, and migrate a file stored in the public cloud storage system that does not meet the reliability requirement to one or more public cloud storage systems that meet the reliability requirement. The reliability processing unit 26 connects to the status monitoring management unit 24 and the status test management unit 25, and is configured to acquire the data about the current running status of and the historical data about the running status of each public cloud storage system from the status monitoring management unit 24 or the status test management unit 25.

In an optional implementation of this embodiment, the reliability processing unit 26 may determine, according to the data about the current running status of each public cloud storage system in the status monitoring management unit 24 or the status test management unit 25, whether the data about the current running status of each public cloud storage system is beyond a preset status threshold range; determine a public cloud storage system that is beyond the status threshold range and a public cloud storage systems that is not beyond the status threshold range; acquire the historical data about the running status of the public cloud storage system that is beyond the status range threshold from the status monitoring management unit 24 or the status test management unit 25; determine the running status change trend according to the acquired historical data about the running status; when the running status change trend is abnormal, determine that the public cloud storage system that is beyond the status threshold range is the public cloud storage system that does not meet the reliability requirement. For example, it is assumed that the running status data is the storage speed of the public cloud storage system; if determining that the current storage speed of the public cloud storage system is beyond a preset storage speed threshold range (for example, larger than a storage speed upper limit or smaller than a storage speed lower limit), the reliability processing unit 26 may acquire a storage speed of the public cloud storage system within a period of time (namely, historical storage speed); determine whether the storage speed of the pubic cloud storage system is stable in the period of time according to the acquired storage speed; if determining, according to the storage speed in the period of time, that the storage speed of the public cloud storage system decreases or increases progressively, determine that the reliability of the public cloud storage system does not meet the reliability requirement; in addition, if the storage speed of the public cloud storage system fluctuates greatly within the period of time, may also determine that the reliability of the public cloud storage system does not meet the reliability requirement.

Optionally, the determining, by the reliability processing unit 26, whether the data about the current running status of each public cloud storage system is beyond the preset status threshold range and whether the running status trend of each public cloud storage system is normal may be performed according to a preset determination rule. When the public cloud storage system matches a determination rule, it may be considered that the public cloud storage system is a public cloud system whose reliability does not meet the reliability requirement. The determination rule uses one or multiple pieces of data in the running status data as a determination basis and lasts for a certain consecutive time duration. For example, a determination rule is that the storage speed is smaller than 10 kbit/s, the available storage space percentage is smaller than 50%, and the duration is five sampling periods. If the public cloud storage system meets the rule, it can be determined that the public cloud storage system is a public cloud storage system whose reliability does not meet the reliability requirement. For another example, a determination rule is that a user interface fails to be invoked for three times. If an operation on the public cloud storage system meets the rule, it can be determined that the public cloud storage system is a public cloud storage system whose reliability does not meet the reliability requirement.

After it is determined that a public cloud storage system is a public cloud storage system whose reliability does not meet the reliability requirement, a file stored on the public cloud storage system is migrated to a public cloud storage system whose reliability meets the reliability requirement.

For description herein, the file migration refers to a process in which a file or a blocked file in a public cloud storage system that does not meet the reliability requirement to another public cloud storage system that meets the reliability requirement. Optionally, redundancy generally exists in the file or the blocked file. Therefore, the file or the blocked file may be acquired from the public cloud storage system other than public cloud storage systems that do not meet the reliability requirement. If redundancy does not exist in the file or the blocked file, the reliability processing unit 26 may try to acquire the file or the blocked file from a public cloud storage system that is marked as a public cloud storage system that does not meet the reliability requirement, and then store the file or the blocked file in another pubic cloud storage system that meets the reliability requirement.

In an optional implementation of this embodiment, the reliability processing unit 26 may further update a reliability status of each public cloud storage system. For example, when a public cloud storage system changes from a status in which the reliability requirement is met to the status in which the reliability requirement is not met, the reliability status of the public cloud storage system is updated to unreliable. Otherwise, the status is updated to reliable.

Apart from monitoring the running status of each public cloud storage system, the storage management apparatus in this embodiment may further perform processing, such as prewarning and migrating data, according to a running status monitoring result of each public cloud storage system, further enhancing file security and reliability.

In an optional implementation of this embodiment, the storage management unit 22 may determine, according to the data about the current running status of each public cloud storage system obtained by the status monitoring management unit 24 or the status test management unit 25, a first pubic cloud storage system for storing a first file among multiple public cloud storage systems. Optionally, the storage management unit 22 connects to the status monitoring management unit 24 and the status test management unit 25. Specifically, the storage management unit 22 determines, according to the data about the current running status of each public cloud storage system, a public cloud storage system with a best running status among multiple public cloud storage systems as the first public cloud storage system. The best running status is based on the current running status data. For example, if current running status data is a current response speed and a current response speed of a public cloud storage system is relatively fast, a public cloud storage system with the fastest current response speed is considered as the public cloud storage system with the best running status. For another example, if the current running status data includes the current response speed and currently available storage space, a public cloud storage system with the fastest current response speed and the maximum currently available storage space is the public cloud storage system with the best running status. The manner of determining a current running status of a public cloud storage system according to data about the current running status data of the public cloud storage system is not restricted to foregoing examples and may be defined according to a practical application.

In an optional implementation of this embodiment, the read management unit 23 may further determine, according to the historical data about the current running status of each public cloud storage system obtained by the status monitoring management unit 24 or the status test management unit 25, a second storage position corresponding to storage of a second file. Optionally, the read management unit 23 connects to the status monitoring management unit 24 and the status test management unit 25.

Figure 5:
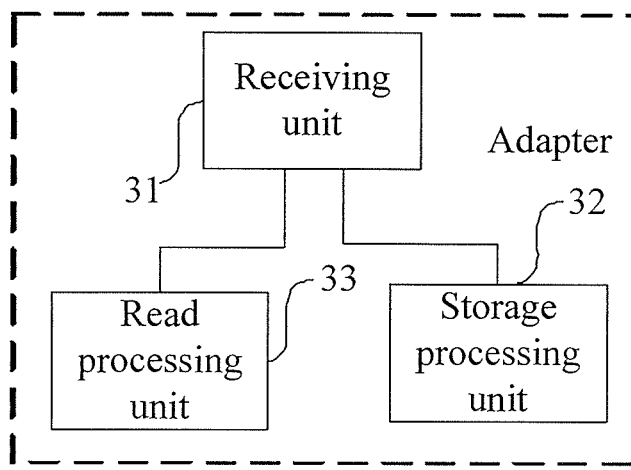
FIG. 5 is a schematic structural diagram of an adapter according to an embodiment of the present invention.

FIG. 5 is a schematic structural diagram of an adapter according to an embodiment of the present invention. As shown in FIG. 5, the adapter in this embodiment includes a receiving unit 31, a storage processing unit 32, and a read processing unit 33.

The receiving unit 31 connects to a storage management apparatus and is configured to receive an operation instruction sent by the storage management apparatus.

The storage processing unit 32 connects to the receiving unit 31 and the storage management apparatus and is configured to, if the operation instruction received by the receiving unit 31 is a storage invoking command, store a first file in a first public cloud storage system; receive a first storage position of the first file in the first public cloud storage system, where the first storage position is returned by the first public cloud storage system and the storage invoking command includes an identifier of the first file; and send the first storage position to the storage management apparatus, so that the storage management apparatus stores, in a file position table, a correspondence relationship between the identifier of the first file and the first storage position.

The storage invoking command is sent after the storage management apparatus determines the first public cloud storage system for storing the first file. The storage invoking command carries the identifier of the first file to notify the storage processing unit 32 of a file to be stored. Optionally, the storage management apparatus may determine the first public cloud storage system among multiple public cloud storage systems after receiving a storage instruction sent by a user interface apparatus, where the storage instruction includes the identifier of the first file. After receiving the first storage position returned by the storage processing unit 32, the storage management apparatus stores, in the file position table, the correspondence relationship between the identifier of the first file and the first storage position.

The read processing unit 33 connects to the receiving unit 31 storage management apparatus and is configured to, if the operation instruction received by the receiving unit 31 is a read-out invoking command, acquire, according to a second storage position, a second file from a second public cloud storage system and send the second file to the storage management apparatus, where the read-out invoking command is sent after the storage management apparatus determines the second storage position according to an identifier of the second file and a correspondence relationship, in the file position table, between an identifier of a file and a storage position of the file.

Optionally, the storage management apparatus may acquire the identifier of the second file from an read instruction after receiving the read instruction sent by the user interface apparatus, and then determine the second storage position according to the identifier of the second file and the correspondence relationship, in the file position table, between the identifier of the file and the storage position of the file.

For description herein, the adapter in this embodiment, by working with the storage management apparatus in the foregoing embodiments, may complete conversion between a user interface provided by a file storage system and a user interface provided by a public cloud storage system and provide a unified file operation interface for the storage management apparatus, thereby shielding differences brought by user interfaces of different public cloud storage systems.

It can be seen from the above that the adapter in this embodiment may process access of different public cloud storage systems and use an existing public cloud storage system as a basic storage device. This simplifies implementation and functions of the storage management apparatus and provides a condition for constructing a relatively simple and low-cost file storage system.

Figure 6:
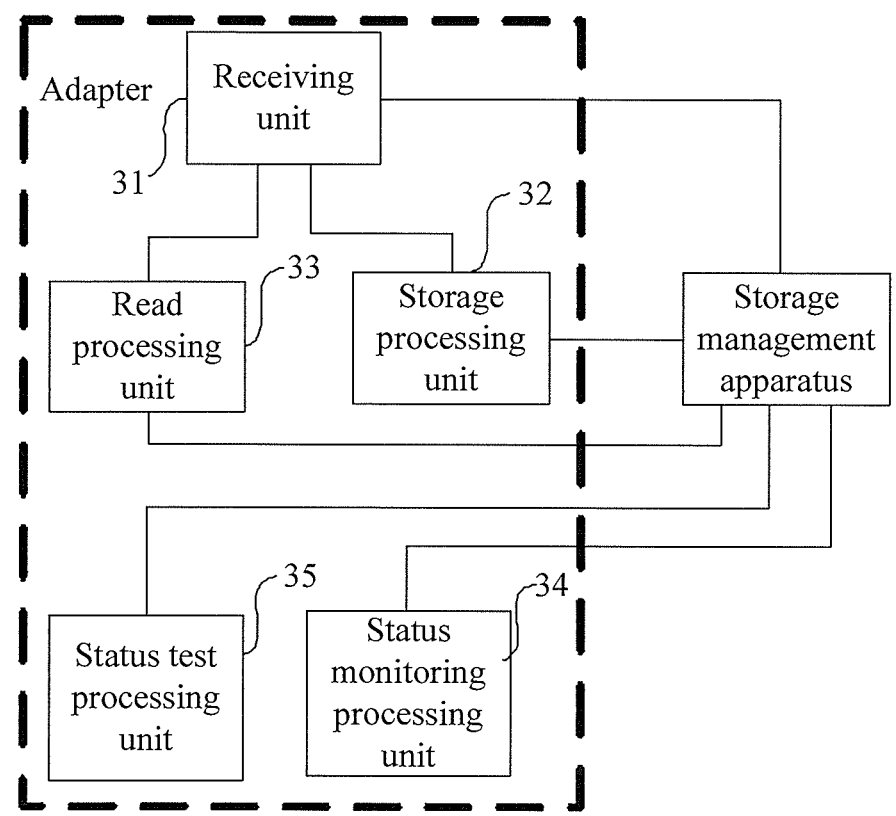
FIG. 6 is a schematic structural diagram of an adapter according to another embodiment of the present invention.

FIG. 6 is a schematic structural diagram of an adapter according to another embodiment of the present invention. This embodiment is implemented based on the embodiment illustrated in FIG. 5. As shown in FIG. 6, the adapter in this embodiment includes a status monitoring processing unit 34 in addition to the receiving unit 31, the storage processing unit 32, and the read processing unit 33.

The status monitoring processing unit 34 connects to the storage management apparatus and is configured to periodically receive a status monitoring command sent by the storage management apparatus; invoke, according to the status monitoring command, a user interface for acquiring running status data, where the user interface is provided by a corresponding public cloud storage system; acquire data about a current running status of the public cloud storage system; and send the data about the current running status of the corresponding public cloud storage system to the storage management apparatus, so that the storage management apparatus monitors, according to the current running status data, a running status of the public cloud storage system corresponding to the adapter.

The foregoing status monitoring processing unit 34, by working with the storage management apparatus, acquires, according to the status monitoring command sent by the storage management apparatus and by invoking the user interface provided by the public cloud storage system, the data about the current running status of the corresponding public cloud storage system and returns the data to the storage management apparatus, so that the storage management apparatus may monitor the running status of the public cloud storage system, which is conducive to reliability and security of storing or reading a file when the storage management apparatus uses the public cloud storage system as the basic storage device.

Further, the adapter in this embodiment further includes a status test processing unit 35.

The status test processing unit 35 connects to the storage management apparatus and is configured to receive a status test command sent by the storage management apparatus; store a preset test file in the corresponding public cloud storage system according to the status test command and receive a storage position of the test file, where the storage position of the test file is returned by the public cloud storage system; and send the storage position of the test file to the storage management apparatus, so that the storage management apparatus calculates to obtain, according to the time the status test command is sent and the time the returned storage position of the test file is received, the data about the current running status of the public cloud storage system corresponding to the adapter.

The foregoing status test processing unit 35, by working with the storage management apparatus, simulates, according to the status test command sent by the storage management apparatus, usage of the public cloud storage system by using a test file, so that the storage management apparatus may acquire the data about the current running status of the public cloud storage system and may further monitor a running status of the public cloud storage system, which is conducive to enhancing reliability and security of storing or reading a file when the storage management apparatus uses the public cloud storage system as the basic storage device.

In conclusion, the foregoing embodiments of the present invention have the following beneficial effects: 1. A public cloud storage system and a cloud computing technology are used as a basic storage device. No storage device and storage network need to be dealt with directly, and only an adapter needs to process the access and monitoring of different public cloud storage systems. A storage management apparatus needs to implement only the management of file storage and read so as to construct a file storage system. The construction process is simple and easy to implement, and the implementation cost is low. 2. The reliability guarantee provided by the public cloud storage system is used to construct a heterogeneous pubic cloud file storage system by using coordination and scheduling of multiple pubic cloud storage systems. The constructed file storage system is more reliable. 3. The storage management apparatus, based on the public cloud storage system rather than a private cloud storage system, does not need to have capabilities of management, virtualization, and maintenance on a storage device and a network, but only needs to have capabilities of determining, when storing a file, a public cloud storage system for storing a file to be stored, invoking a corresponding adapter to perform a storage operation, storing a correspondence relationship between information of the storage file, such as a storage position of a file, a file name, a user name, and the like, after file storage is complete, and, when acquiring the file, determining the storage position of the file and invoking the corresponding adapter to perform an acquisition operation. This ensures system reuse to the maximum extent for the file management capability and service capability during a system upgrade. 4. A user focuses on the file storage business, makes full use of benefits brought by the cloud computing technology, and manages and maintains the file storage system without the need of understanding implementation details about the cloud computing technology.

The following embodiments of the present invention describe, from angles of the storage management apparatus 20 and the adapter 30, a process in which the file storage system provided in an embodiment of the present invention performs a file read operation.

Figure 7:
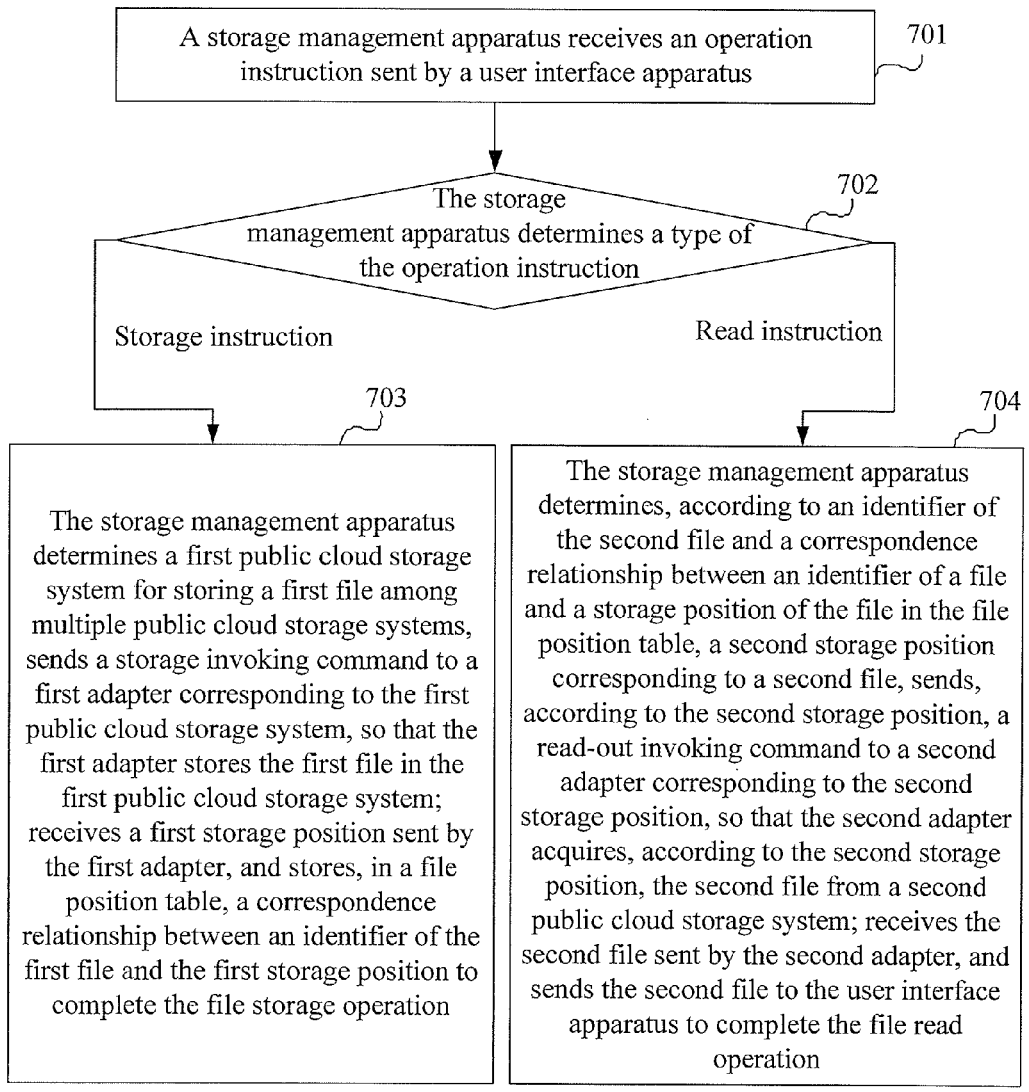
FIG. 7 is a flowchart of a file access method according to an embodiment of the present invention.

FIG. 7 is a flowchart of a file access method according to an embodiment of the present invention. As shown in FIG. 7, the method in this embodiment includes:

Step 701: A storage management apparatus receives an operation instruction sent by a user interface apparatus.

Step 702: The storage management apparatus determines a type of the foregoing operation instruction; if the foregoing operation instruction is a storage instruction for storing a first file, perform step 703; and, if the foregoing operation instruction is a read instruction for reading a second file, perform step 704.

The foregoing storage instruction includes an identifier of the first file. The identifier of the first file may be a name of the first file, a GUID, a URL, or the like. Optionally, the foregoing storage instruction may further include information, such as a user identifier and a size of the first file. The user identifier may be information that may uniquely identify a user, such as a user name or a user account.

The foregoing read instruction includes an identifier of the second file. The identifier of the second file may be a name of the second file, a GUID, a URL, or the like. Optionally, the foregoing read instruction may further include information such as a user identifier.

Step 703: The storage management apparatus determines a first public cloud storage system for storing the first file among multiple public cloud storage systems, sends a storage invoking command to a first adapter corresponding to the first public cloud storage system, so that the first adapter stores the first file in the first public cloud storage system; receives a first storage position sent by the first adapter, and stores, in a file position table, a correspondence relationship between the identifier of the first file and the first storage position to complete the file storage operation.

The first storage position is sent by the first public cloud storage system to the first adapter, and is sent by the first adapter to the storage management apparatus. The first storage position is a storage position of the first file in the first public cloud storage system. The foregoing file position table stores a correspondence relationship between an identifier of a file and a storage position of the file. The storage management apparatus stores the correspondence relationship between the identifier of the first file and the first storage position, so as to determine the storage position of the first file when reading the first file.

Step 704: The storage management apparatus determines, according to the identifier of the second file and the correspondence relationship, in the file position table, between the identifier of the file and the storage position of the file, a second storage position corresponding to the second file and sends, according to the second storage position, a read-out invoking command to a second adapter corresponding to the second storage position, so that the second adapter acquires, according to the second storage position, the second file from a second public cloud storage system; receives the second file sent by the second adapter, and sends the second file to the user interface apparatus to complete the file read operation.

Optionally, the process in which the storage management apparatus determines the first public cloud storage system for storing the first file among multiple public cloud storage systems includes: determining, by the storage management apparatus according to data about current running status of multiple public cloud storage systems, a public cloud storage system with the best running status among multiple public cloud storage systems as the first pubic cloud storage system.

Data about a current running status of a public cloud storage system includes a current response speed of the public cloud storage system and/or a current available storage space of the public cloud storage system. For example, the storage management apparatus may determine a public cloud storage system with the fastest response speed as the public cloud storage system with the best running status; or, the storage management apparatus may determine a public cloud storage system with the maximum available storage space as the public cloud storage system with the best running status; or, the storage management apparatus may determine a public cloud storage system with the fastest response speed and the maximum available storage space as the public cloud storage system with the best running status.

Optionally, before sending the storage invoking command to the first adapter corresponding to the first public cloud storage, the storage management apparatus may perform encryption, blocking, and/or redundancy processing on the first file.

Based on the foregoing, when the second file has a redundant backup and the redundant backup of the second file is stored in more than one public cloud storage system, a process in which the storage management apparatus determines, according to the identifier of the second file and the correspondence relationship, in the file position table, between the identifier of the file and the storage position of the file, the second storage position corresponding to storage of the second file may include: determining, by the storage management apparatus according to the identifier of the second file and the correspondence relationship, in the file position table, between the identifier of the file and the storage position of the file, all public cloud storage systems that store the second file or the redundant backup of the second file, determining, according to the determined data about the current running status of all public cloud storage systems, a public cloud storage system with the best running status as the second public cloud storage system, and acquiring a storage position of the second file or the redundant backup of the second file on the second public cloud storage system and using the storage position as the second storage position.

For the implementation of determining the public cloud storage system with the best running status as the second public cloud storage system according to the determined data about the current running status of all public cloud storage systems, refer to the method in the foregoing implementation of determining the public cloud storage system with the best running status as the first public cloud storage system.

Further, the file access method in this embodiment further includes an operation in which the storage management apparatus acquires the data about the current running status of each public cloud storage system and monitors a running status of each public cloud storage system according to the acquired current running status data. One implementation of the operation includes the following:

First, the storage management apparatus periodically sends a status monitoring command to each adapter, so that each adapter acquires data about a current running status of a corresponding public cloud storage system. Each adapter invokes a user interface for externally acquiring running status data of the corresponding public cloud storage system, to acquire the data about the current running status of the corresponding public cloud storage system, where the user interface is provided by the corresponding public cloud storage system.

Then, the storage management apparatus receives the data about the current running status of the corresponding public cloud storage system sent by each adapter, and monitors a running status of each public cloud storage system according to the data about the current running status of each public cloud storage system.

Another implementation of the foregoing operation includes the following:

First, the storage management apparatus first sends the status test command to each adapter, so that each adapter stores a preset test file in the corresponding public cloud storage system.

Then, the storage management apparatus receives a storage position of the test file in the corresponding public cloud storage system, where the storage position of the test file is sent by each adapter.

Later, the storage management apparatus calculates to obtain the data about the current running status of each public cloud storage system according to the time the status test command is sent to each adapter and the time the storage position of the test file is received, where the storage position of the test file is returned by each adapter. Optionally, the storage management apparatus may monitor running status of each public cloud storage system according to the acquired data about the current running status of each public cloud storage system.

The difference between the two times is the response time and a test packet divided by the response time is to obtain the response speed. This embodiment uses storage of a test packet as an example for description. Therefore, the response speed is the storage speed.

Further, the file access method in this embodiment further includes an operation of migrating a file according to reliability of the public cloud storage system. One implementation of the operation includes the following: The storage management apparatus determines, according to historical data about a running status of and the data about the current running status of each public cloud storage system in multiple public cloud storage systems, a pubic cloud storage system that does not meet a reliability requirement and a public cloud storage system that meets the reliability requirement, and migrate the file stored in the public cloud storage system that does not meet the reliability requirement to one or more public cloud storage systems that meet the reliability requirement.

For a detailed process of the foregoing operation, refer to relevant descriptions in the foregoing embodiments and therefore no further details are provided herein. The file access method provided in this embodiment is implemented based on the file storage system and storage management apparatus provided in embodiments of the present invention. For the detailed process, refer to descriptions in the embodiment of the file storage system or storage management apparatus. The complexity of constructing a file storage system in this embodiment is low, reducing file access complexity to a certain extent, raising the file access efficiency, and helping reduce the file access cost.

Figure 8:
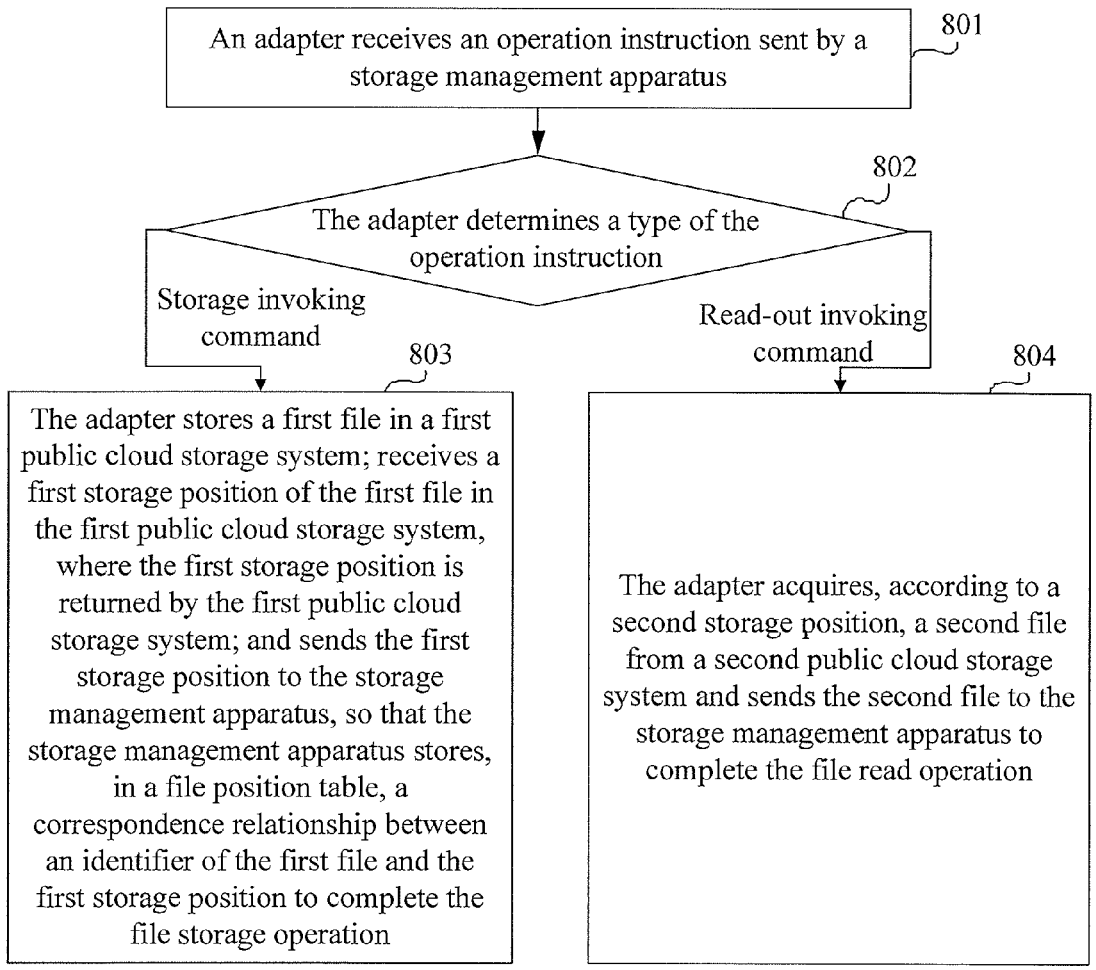
FIG. 8 is a flowchart of a file access method according to another embodiment of the present invention.

FIG. 8 is a flowchart of a file access method according to another embodiment of the present invention. As shown in FIG. 8, the method in this embodiment includes:

Step 801: An adapter receives an operation instruction sent by a storage management apparatus.

Step 802: The adapter determines a type of the foregoing operation instruction; if the foregoing operation instruction is a storage invoking command, perform step 803; and, if the foregoing operation instruction is a read-out invoking command, perform step 804.

Step 803: The adapter stores a first file in a first public cloud storage system; receives a first storage position of the first file in the first public cloud storage system, where the first storage position is returned by the first public cloud storage system; and sends the first storage position to the storage management apparatus, so that the storage management apparatus stores, in a file position table, a correspondence relationship between an identifier of the first file and the first storage position to complete the file storage operation.

The storage invoking command is sent after the storage management apparatus determines, according to the storage instruction, the first public cloud storage system among multiple public cloud storage systems. The foregoing storage instruction is sent by a user subsystem and is used to indicate storage of the first file. The storage instruction includes the identifier of the first file. The foregoing storage invoking command also includes the identifier of the first file, which is used to notify the adapter of a file to be stored.

The storage management apparatus stores the correspondence relationship between the identifier of the first file and the first storage position so as to determine a storage position of the first file when reading the first file.

Step 804: The adapter acquires, according to a second storage position, a second file from a second public cloud storage system and sends the second file to the storage management apparatus to complete the file read operation.

The read-out invoking command is sent after the storage management apparatus determines the second storage position according to an identifier of the second file and a correspondence relationship, in the file position table, between an identifier of a file and a storage position of the file.

Further, the file access method in this embodiment further includes an operation in which data about a current running status of each public cloud storage system is acquired according to an instruction of the storage management apparatus and the data is sent to the storage management apparatus. The operation specifically includes the following:

First, the adapter periodically receives a status monitoring command sent by the storage management apparatus.

Then, the adapter invokes, according to the status monitoring command, a user interface for acquiring running status data, where the user interface is provided by the public cloud storage system corresponding to the adapter; and acquires data about a current running status of a corresponding public cloud storage system.

Later, the adapter later sends the acquired data about the current running status of the corresponding public cloud storage system to the storage management apparatus, so that the storage management apparatus monitors, according to acquired current running status data, a running status of the public cloud storage system corresponding to the adapter.

Further, the file access method in this embodiment further includes an operation in which the adapter simulates a file storage operation on the public cloud storage system according to the status test command of the storage management apparatus, so that the storage management apparatus acquires the data about the current running status of the public cloud storage system corresponding to the adapter. The operation specifically includes the following:

First, the adapter receives the status test command sent by the storage management apparatus.

Then, the adapter stores, according to the status test command, a preset test file in the public cloud storage system corresponding to the adapter and receives the storage position of the test file, where the storage position of the test file is returned by the corresponding public cloud storage system.

Later, the adapter sends the storage position of the test file to the storage management apparatus, where the storage position of the test file is returned by the public cloud storage system, so that the storage management apparatus calculates to obtain, according to the time the status test command is sent to the adapter and the time the storage position of the test file is received, where the storage position of the test file is returned by the adapter, the data about the current running status of the public cloud storage system corresponding to the adapter.

For a detailed process of the foregoing operations, refer to relevant descriptions in the foregoing embodiments and therefore no further details are provided herein.

The file access method provided in this embodiment is implemented based on the file storage system, the storage management apparatus, and the adapter provided in embodiments of the present invention. For a detailed process, refer to descriptions in the foregoing embodiments. The complexity of constructing a file storage system in this embodiment is low, thereby reducing file access complexity to a certain extent, raising file access efficiency, and helping reduce the file access cost.

A person of ordinary skill in the art may understand that all or a part of the steps of the foregoing method embodiments may be implemented by a computer program instructing relevant hardware. The program may be stored in a computer readable storage medium. When the program runs, the steps of the method embodiments are performed. The foregoing storage medium includes any medium that can store program code, such as a USB flash drive, a removable hard disk, a ROM, a RAM, a magnetic disc, or an optical disc.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that he may still make modifications to the technical solutions described in the foregoing embodiments or make equivalent replacements to some technical features thereof, without departing from the spirit and scope of the technical solutions of the embodiments of the present invention.

What is claimed is:

1. A file storage system, comprising: a storage management apparatus and an adapter, wherein:
    the storage management apparatus is configured to receive an operation instruction sent by a user interface apparatus; if the operation instruction is a storage instruction for storing a first file and the storage instruction comprises an identifier of the first file, determine a first public cloud storage system for storing the first file among multiple public cloud storage systems and send a storage invoking command to a first adapter corresponding to the first public cloud storage system, so that the first adapter stores the first file in the first public cloud storage system; receive a first storage position sent by the first adapter, and store, in a file position table, a correspondence relationship between the identifier of the first file and the first storage position, where the first storage position is sent by the first public cloud storage system to the first adapter, the first storage position is a storage position of the first file in the first public cloud storage system, and the file position table stores a correspondence relationship between an identifier of a file and a storage position of the file; and if the operation instruction is a read instruction for reading a second file, and the read instruction comprises an identifier of the second file, determine, according to the identifier of the second file and the correspondence relationship, in the file position table, between the identifier of the file and the storage position of the file, a second storage position corresponding to storage of the second file, and send, according to the second storage position, a read-out invoking command to a second adapter corresponding to the second storage position, so that the second adapter acquires, according to the second storage position, the second file from a second public cloud storage system; receive the second file sent by the second adapter, and send the second file to the user interface apparatus; and the adapter is configured to receive the operation instruction sent by the storage management apparatus; if the operation instruction is the storage invoking command, store the first file in the first public cloud storage system and receive the first storage position of the first file in the first public cloud storage system, wherein the first storage position is returned by the first public cloud storage system, and the storage invoking command comprises the identifier of the first file; send the first storage position to the storage management apparatus, so that the storage management apparatus stores, in the file position table, the correspondence relationship between the identifier of the first file and the first storage position; and, if the operation instruction is the read-out invoking command, acquire, according to the second storage position, the second file from the second public cloud storage system, and send the second file to the storage management apparatus, wherein the read-out invoking command is sent after the storage management apparatus determines the second storage position according to the identifier of the second file and the correspondence relationship, in the file position table, between the identifier of the file and the storage position of the file.

2. The file storage system according to claim 1, further comprising: a user interface apparatus, configured to receive the storage instruction for storing the first file, and send the storage instruction to the storage management apparatus, so that the storage management apparatus performs a storage operation on the first file according to the storage instruction, wherein the storage instruction is inputted by an instruction input device, and the storage instruction comprises the identifier of the first file; or receive the read instruction for reading the second file, and send the read instruction to the storage management apparatus, so that the storage management apparatus performs a read operation on the second file; and receive the second file returned by the storage management apparatus, wherein the read instruction is inputted by the instruction input device and the read instruction comprises the identifier of the second file.

3. A storage management apparatus, comprising:
an instruction receiving and management unit, configured to receive an operation instruction sent by a user interface apparatus;

a storage management unit, configured to, if the operation instruction is a storage instruction for storing a first file, and the storage instruction comprises an identifier of the first file, determine a first public cloud storage system for storing the first file among multiple public cloud storage systems and send a storage invoking command to a first adapter corresponding to the first public cloud storage system, so that the first adapter stores the first file in the first public cloud storage system; receive a first storage position sent by the first adapter, and store, in a file position table, a correspondence relationship between the identifier of the first file and the first storage position, wherein the first storage position is sent by the first public cloud storage system to the first adapter, the first storage position is a storage position of the first file in the first public cloud storage system, and the file position table stores a correspondence relationship between an identifier of a file and a storage position of the file; and a read management unit, configured to, if the operation instruction is a read instruction for reading a second file, and the read instruction comprises an identifier of the second file, determine, according to the identifier of the second file and the correspondence relationship, in the file position table, between the identifier of the file and the storage position of the file, a second storage position corresponding to storage of the second file and send, according to the second storage position, a read-out invoking command to a second adapter corresponding to the second storage position, so that the second adapter, according to the second storage position, acquires the second file from a second public cloud storage system; receive the second file sent by the second adapter and send the second file to the user interface apparatus.

4. The storage management apparatus according to claim 3, further comprising: a status monitoring management unit, configured to periodically send a status monitoring command to each adapter, so that each adapter acquires data about a current running status of a corresponding public cloud storage system; receive the data about the current running status of the corresponding public cloud storage system sent by each adapter; and monitor a running status of each public cloud storage system according to the data about the current running status of each public cloud storage system.

5. The storage management apparatus according to claim 4, further comprising: a reliability processing unit, configured to determine, according to historical data about a running status of and the data about the current running status of each public cloud storage system in multiple public cloud storage systems, a pubic cloud storage system that does not meet a reliability requirement and a public cloud storage system that meets the reliability requirement, and migrate a file stored in the public cloud storage system that does not meet the reliability requirement to one or more public cloud storage systems that meet the reliability requirement.

6. The storage management apparatus according to claim 3, further comprising: a status test management unit, configured to send a status test command to each adapter, so that each adapter stores a preset test file in a corresponding public cloud storage system; receive a storage position of the test file in the corresponding public cloud storage system, wherein the storage position of the test file is sent by each adapter; and calculate to obtain data about a current running status of each public cloud storage system according to the time the status test command is sent to each adapter and the time the storage position of the test file is received, wherein the storage position of the test file is returned by each adapter.

7. An adapter, comprising:
a receiving unit, configured to receive an operation instruction sent by a storage management apparatus;
a storage processing unit, configured to, if the operation instruction is a storage invoking command, store a first file in a first public cloud storage system, receive a first storage position of the first file in the first public cloud storage system, wherein the first storage position is returned by the first public cloud storage system and the storage invoking command comprises an identifier of the first file; and send the first storage position to the storage management apparatus, so that the storage management apparatus stores, in a file position table, a correspondence relationship between the identifier of the first file and the first storage position; and
a read processing unit, configured to, if the operation instruction is a read-out invoking command, acquire, according to a second storage position, a second file from a second public cloud storage system and send the second file to the storage management apparatus, wherein the read-out invoking command is sent after the storage management apparatus determines the second storage position according to an identifier of the second file and a correspondence relationship, in the file position table, between an identifier of a file and a storage position of the file;
a status test processing unit, configured to receive a status test command sent by the storage management apparatus; store a preset test file in a corresponding public cloud storage system according to the status test command and receive a storage position of the test file, wherein the storage position of the test file is returned by the public cloud storage system; and send the storage position of the test file to the storage management apparatus, so that the storage management apparatus calculates to obtain, according to the time the status test command is sent and the time the returned storage position of the test file is received, data about the current running status of the public cloud storage system corresponding to the adapter.

8. The adapter according to claim 7, further comprising: a status monitoring processing unit, configured to periodically receive a status monitoring command sent by the storage management apparatus; invoke, according to the status monitoring command, a user interface for acquiring running status data and acquire data about a current running status of the public cloud storage system, wherein the user interface is provided by a corresponding public cloud storage system; and send the data about the current running status of the corresponding public cloud storage system to the storage management apparatus, so that the storage management apparatus monitors, according to the current running status data, a running status of the public cloud storage system corresponding to the adapter.

9. A file access method, comprising:
receiving, by a storage management apparatus, an operation instruction sent by a user interface apparatus;
if the operation instruction is a storage instruction for storing a first file, and the storage instruction comprises an identifier of the first file, determining, by the storage management apparatus, a first public cloud storage system for storing the first file among multiple public cloud storage systems and sending a storage invoking command to a first adapter corresponding to the first public cloud storage system, so that the first adapter stores the first file in the first public cloud storage system; receiving a first storage position sent by the first adapter and storing, in a file position table, a correspondence relationship between the identifier of the first file and the first storage position, wherein the first storage position is sent by the first public cloud storage system to the first adapter, the first storage position is a storage position of the first file in the first public cloud storage system, and the file position table stores a correspondence relationship between an identifier of a file and a storage position of the file;
if the operation instruction is a read instruction for reading a second file, and the read instruction comprises an identifier of the second file, determining, by the storage management apparatus according to the identifier of the second file and the correspondence relationship, in the file position table, between the identifier of the file and the storage position of the file, a second storage position corresponding to storage of the second file and sending, according to the second storage position, a read-out invoking command to a second adapter corresponding to the second storage position, so that the second adapter acquires, according to the second storage position, the second file from a second public cloud storage system; receiving the second file sent by the second adapter, and sending the second file to the user interface apparatus.

10. The file access method according to claim 9, wherein determining, by the storage management apparatus, the first public cloud storage system for storing the first file among multiple public cloud storage systems comprises:
determining, by the storage management apparatus, a public cloud storage system with the best running status among multiple public cloud storage systems as the first public cloud storage system according to data about current running status of multiple public cloud storage systems, wherein the current running status data comprises a current response speed of the public cloud storage system and/or a current available storage space of the public cloud storage system.

11. The file access method according to claim 9, wherein before sending the storage invoking command to the first adapter corresponding to the first public cloud storage system, the method further comprises:
performing encryption, blocking, and/or redundancy processing on the first file.

12. The file access method according to claim 11, wherein:
the second file has a redundant backup, the redundant backup of the second file is stored in more than one public cloud storage system; and
determining, by the storage management apparatus according to the identifier of the second file and the correspondence relationship, in the file position table, between the identifier of the file and the storage position of the file, the second storage position corresponding to storage of the second file comprises:
determining, by the storage management apparatus according to the identifier of the second file and the correspondence relationship, in the file position table, between the identifier of the file and the storage position of the file, all public cloud storage systems that store the second file or the redundant backup of the second file, determining, according to data about current running status of all public cloud storage systems, a pubic cloud storage system with the best running status as the second public cloud storage system, and acquiring a storage position of the second file or the redundant backup of the second file in the second public cloud storage system and using the storage position as the second storage position.

13. The file access method according to claim 9, further comprising:

- periodically sending, by the storage management apparatus, a status monitoring command to each adapter, so that each adapter acquires data about a current running status of a corresponding public cloud storage system; and
- receiving the data about the current running status of the corresponding public cloud storage system sent by each adapter, and monitoring a running status of each public cloud storage system according to the data about the current running status of each public cloud storage system.

14. The file access method according to claim 13, further comprising:

- determining, by the storage management apparatus according to historical data about a running status of and the data about the current running status of each public cloud storage system in multiple public cloud storage systems, a pubic cloud storage system that does not meet a reliability requirement and a public cloud storage system that meets the reliability requirement and migrating a file stored in the public cloud storage system that does not meet the reliability requirement to one or more public cloud storage systems that meet the reliability requirement.

15. The file access method according to claim 9, further comprising:

- sending, by the storage management apparatus, a status test command to each adapter, so that each adapter stores a preset test file in the corresponding public cloud storage system;
- receiving a storage position of the test file in the corresponding public cloud storage system, wherein the storage position is sent by each adapter; and
- calculating to obtain data about a current running status of each public cloud storage system according to the time the status test command is sent to each adapter and the time the storage position of the test file is received, wherein the storage position is returned by each adapter.

16. A file access method, comprising:

- receiving, by an adapter, an operation instruction sent by a storage management apparatus;
- if the operation instruction is a storage invoking command, storing, by the adapter, a first file in a first public cloud storage system; receiving a first storage position of the first file in the first public cloud storage system, wherein the first storage position is returned by the first public cloud storage system, and the storage invoking command comprises an identifier of the first file; and sending the first storage position to the storage management apparatus, so that the storage management apparatus stores, in a file position table, a correspondence relationship between the identifier of the first file and the first storage position; and
- if the operation instruction is a read-out invoking command, acquiring, by the adapter according to a second storage position, a second file from a second public cloud storage system and sending the second file to the storage management apparatus, wherein the read-out invoking command is sent after the storage management apparatus determines the second storage position according to an identifier of the second file and a correspondence relationship, in the file position table, between an identifier of a file and a storage position of the file;
- receiving, by the adapter, a status test command sent by the storage management apparatus;
- storing, according to the status test command, a preset test file in the public cloud storage system corresponding to the adapter and receiving a storage position of the test file, wherein the storage position is returned by the public cloud storage system; and
- sending the storage position of the test file to the storage management apparatus, so that the storage management apparatus calculates to obtain, according to the time the status test command is sent to the adapter and the time the storage position of the test file is received, data about a current running status of the public cloud storage system corresponding to the adapter, wherein the storage position of the test file is returned by the adapter.

17. The file access method according to claim 16, further comprising:

- periodically receiving, by the adapter, a status monitoring command sent by the storage management apparatus;
- invoking, according to the status monitoring command, a user interface for acquiring running status data, wherein the user interface is provided by a public cloud storage system corresponding to the adapter; and acquiring data about a current running status of the public cloud storage system; and
- sending, by the adapter, the data about the current running status of the corresponding public cloud storage system to the storage management apparatus, so that the storage management apparatus monitors, according to the current running status data, a running status of the public cloud storage system corresponding to the adapter.

\* \* \* \* \*